(12) United States Patent
Magnani

(10) Patent No.: US 10,059,158 B2
(45) Date of Patent: Aug. 28, 2018

(54) TIRE-CHANGING MACHINE FOR MOTOR VEHICLES

(71) Applicant: M&B ENGINEERING S.R.L., Correggio (IT)

(72) Inventor: Franco Magnani, Correggio (IT)

(73) Assignee: M&B Engineering S.r.l., Correggio (IT)

( * ) Notice: Subject to any disclaimer, the term of this patent is extended or adjusted under 35 U.S.C. 154(b) by 94 days.

(21) Appl. No.: 15/322,106

(22) PCT Filed: Jun. 25, 2015

(86) PCT No.: PCT/IB2015/054761
§ 371 (c)(1),
(2) Date: Dec. 24, 2016

(87) PCT Pub. No.: WO2015/198251
PCT Pub. Date: Dec. 30, 2015

(65) Prior Publication Data
US 2017/0120702 A1 May 4, 2017

(30) Foreign Application Priority Data
Jun. 25, 2014 (IT) .............. PG2014A0033

(51) Int. Cl.
*B60C 25/05* (2006.01)
*B60C 25/138* (2006.01)
*G01M 1/02* (2006.01)

(52) U.S. Cl.
CPC ........ *B60C 25/0512* (2013.01); *B60C 25/138* (2013.01); *G01M 1/02* (2013.01)

(58) Field of Classification Search
CPC ..... B60C 25/0512; B60C 25/138; G01M 1/02
See application file for complete search history.

(56) References Cited

U.S. PATENT DOCUMENTS

| 5,385,045 | A | * | 1/1995 | Mannen | ................. B60C 25/00 73/462 |
| 7,355,687 | B2 | * | 4/2008 | Voeller | .................... B60C 11/24 356/139.09 |
| 7,495,755 | B2 | * | 2/2009 | Voeller | .................... B60C 11/24 356/139.09 |

FOREIGN PATENT DOCUMENTS

| DE | 4323549 A1 | 1/1994 |
| EP | 2711206 A1 | 3/2014 |

OTHER PUBLICATIONS

European Search Report dated Mar. 4, 2015 from Italian Patent Application No. PC2014A000033 filed Jun. 25, 2014.
(Continued)

*Primary Examiner* — David B Thomas
(74) *Attorney, Agent, or Firm* — Sunstone IP

(57) ABSTRACT

A tire-changing machine for motor vehicles, comprising a bearing frame, at least a tire-changing device associated with the frame, having at least a support element of a wheel that can be driven in rotation around a first axis substantially vertical and at least a tool movable with respect to the support element to allow the removal of the tire from the wheel, a wheel balancing device associated with the frame, and where balancing device comprises at least a base element associated with the frame and at least a shaft supported in rotation by the base element around a second axis substantially horizontal and able to receive the wheel to be balanced.

6 Claims, 2 Drawing Sheets

(56) References Cited

OTHER PUBLICATIONS

International Search Report and Written Opinion dated Oct. 20, 2015 from International Patent Application No. PCT/IB2015/054761 filed Jun. 25, 2015.

* cited by examiner

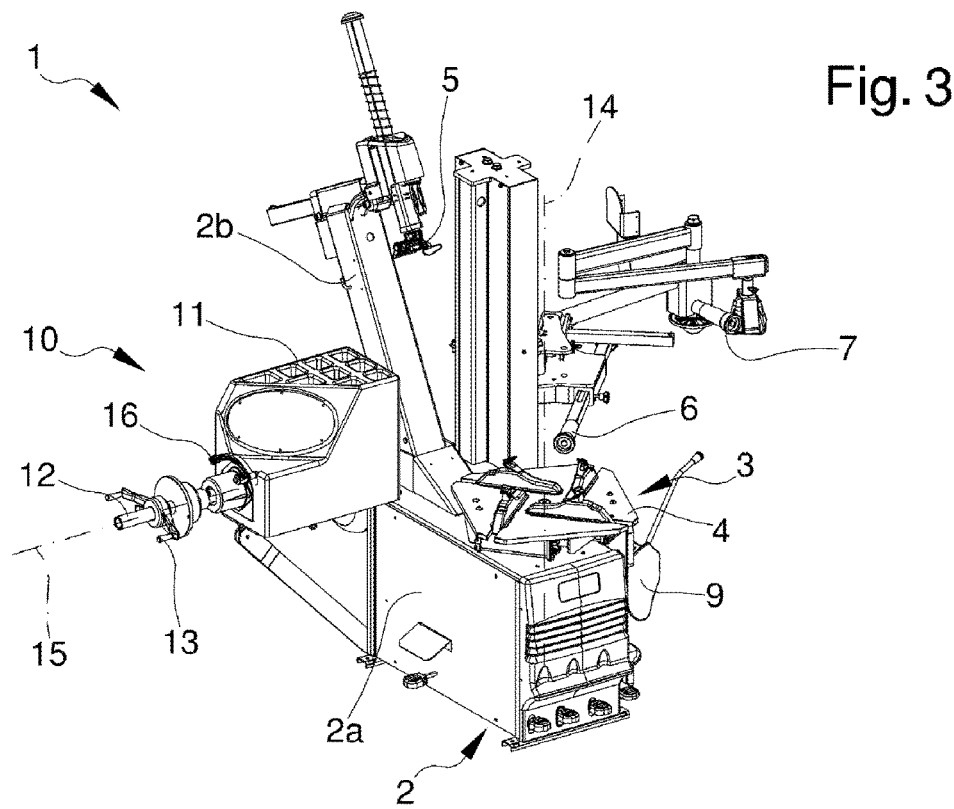
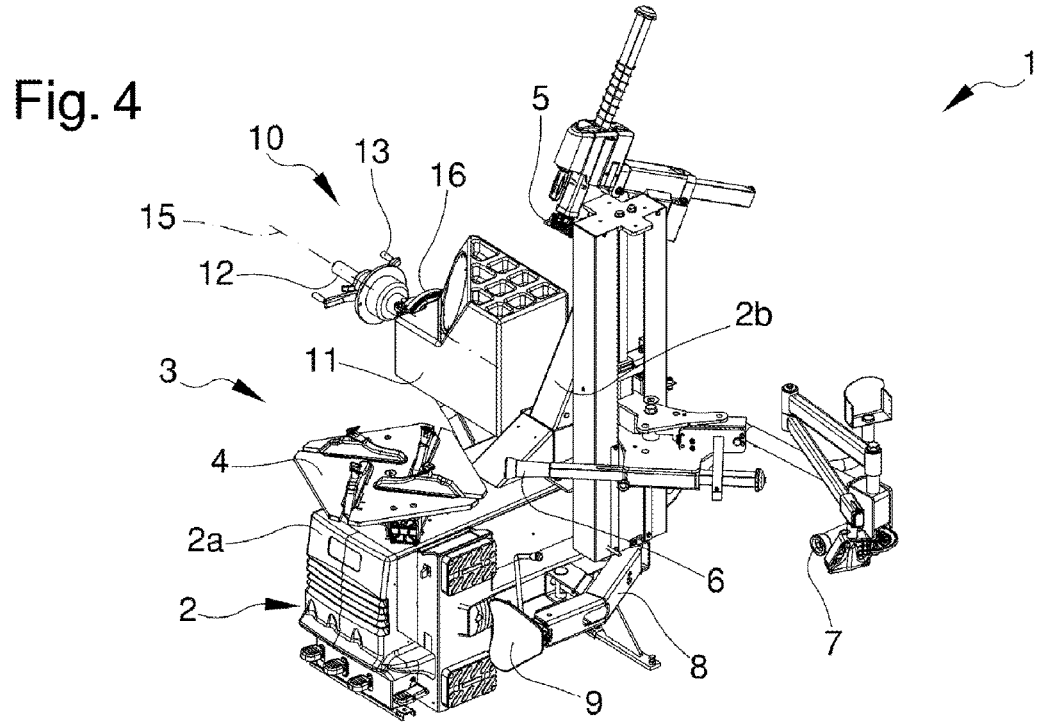

TIRE-CHANGING MACHINE FOR MOTOR VEHICLES

TECHNICAL FIELD

The present invention relates to a tire-changing machine for motor vehicles.

BACKGROUND ART

As is known, the tire-changing machines are generally used to remove a tire from the relative rim.

More particularly, the tire-changing machines known to date are generally composed of a bearing frame with which is associated a wheel support element and a tool intended to cooperate with the relative tire for the removal of the same. The wheel support element can be driven in rotation around a relative axis in order to allow the complete removal of the tire from the relative rim.

Once the tire removal operation has finished, it is necessary to position the repaired or replaced wheel onto a relative wheel balancing machine, separate from the above-mentioned tire-changing machine, which is able to calculate the offset masses that are to be applied onto the relative rim and to identify the points of application of the same.

These tire-changing machines of known type have a number of drawbacks.

More particularly, they do not allow to remove a tire and balance a wheel. With the equipment available to date, in fact, to perform these operations one should necessarily be equipped with both a tire-changing machine and a balancing machine.

As can easily be appreciated by the technician of the sector, this entails first of all a considerable cost, since it requires the purchase of two separate machines, as well as a discomfort for the operator in terms of equipment management.

The use of two separate machines for the removal and balancing of a wheel, in addition to the limits described above, also entails large overall dimensions and therefore the need to have a suitable space available.

DESCRIPTION OF THE INVENTION

The main aim of the present invention is to provide a tire-changing machine for motor vehicles that allows to perform both the tire removal and wheel balancing operations.

Within this aim, one object of the present invention is to provide a tire-changing machine which is of limited overall dimensions, so as to reduce the space necessary and required for its use.

Another object of the present invention is therefore to reduce the investment necessary for the performance of the removal and balancing operations and to simplify, at the same time, the performance of these operations by the assigned operator.

Another object of the present invention is to provide a tire-changing machine for motor vehicles which allows to overcome the mentioned drawbacks of the prior art within the ambit of a simple, rational, easy, effective to use as well as affordable solution.

The objects stated above are achieved by the present tire-changing machine for motor vehicles according to claim 1.

BRIEF DESCRIPTION OF THE DRAWINGS

Specific embodiments of the invention and advantageous technical-functional characteristics related to these embodiments will be described below, in agreement with what reported in the claims and with the aid of the accompanying drawing tables, in which:

FIG. 3 is a first axonometric view of a machine according to the invention in a second embodiment;

FIG. 4 is a second axonometric view of the machine of FIG. 3.

EMBODIMENTS OF THE INVENTION

Figure 1:
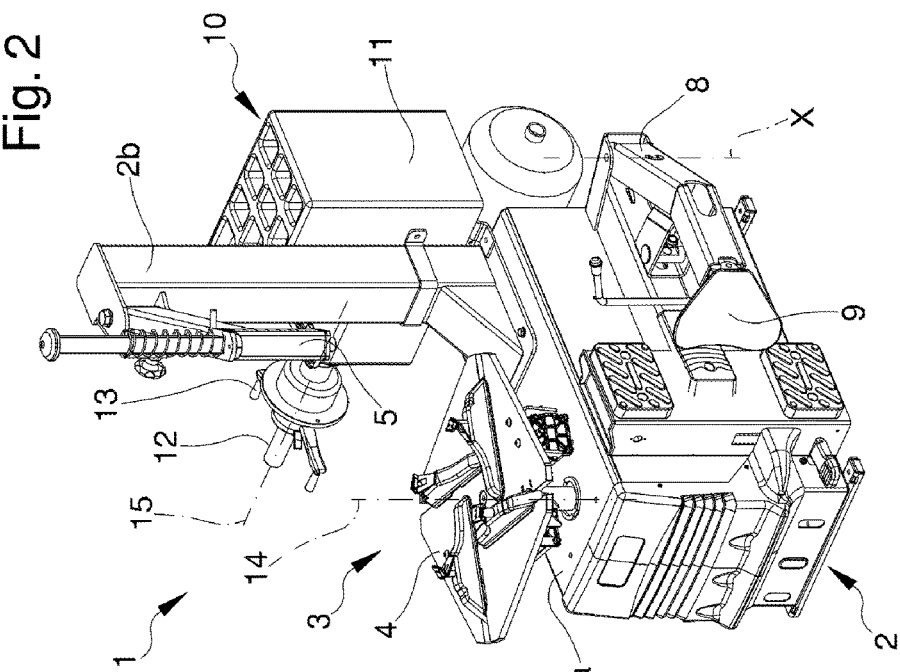
FIG. 1 is a first axonometric view of a machine according to the invention in a first embodiment.

With particular reference to such figures, globally indicated with reference number 1 is a tire-changing machine for motor vehicles.

The machine 1 comprises a bearing frame 2 and at least a tire-changing device 3 associated with the frame 2.

The tire-changing device 3 has at least a support element 4 of a wheel that can be driven in rotation around a first axis 14 substantially vertical and at least a tool 5 movable with respect to the support element 4 to allow the removal of the tire from the wheel when this is mounted on the support element itself.

More particularly, the support element 4 is the type of a spindle configured to tighten the wheel rim onto it, e.g. by means of the cooperation with a hub or known locking clamps.

The frame 2 comprises a base portion 2a, that may be positioned resting on the ground and with which the support element 4 is associated, and an upright 2b that extends vertically upwards from the base portion 2a and that supports the tool 5.

In the second embodiment shown in FIGS. 3 and 4, the machine 1 also comprises a first and a second auxiliary tool, identified in the figures by reference numbers 6 and 7 and of the type known to the technician of the sector, which can be used in the tire fitting and removal operations.

With the frame 2 is also associated a bead breaker arm 8 with known "blade" or bead breaking tool 9.

The bead breaker arm 8, in particular, is hinged to the base portion 2a around a pivoting axis X substantially vertical.

By rotating around the pivoting axis X, the bead breaker arm 8 can be approached to the base portion 2a horizontally displacing the bead breaking tool 9 from the rim as a preliminary operation to removal.

According to the invention, the machine 1 also comprises a wheel balancing device 10 associated with the frame 2.

The balancing device 10 comprises at least a base element 11 associated with the frame 2 and at least a shaft 12, meant to receive the wheel to be balanced, supported in rotation by the base element itself around a second axis 15 substantially horizontal.

Advantageously, the base element 11 is arranged at the peripheral edge of the frame 2 and is turned to the outside of the same.

Figure 2:
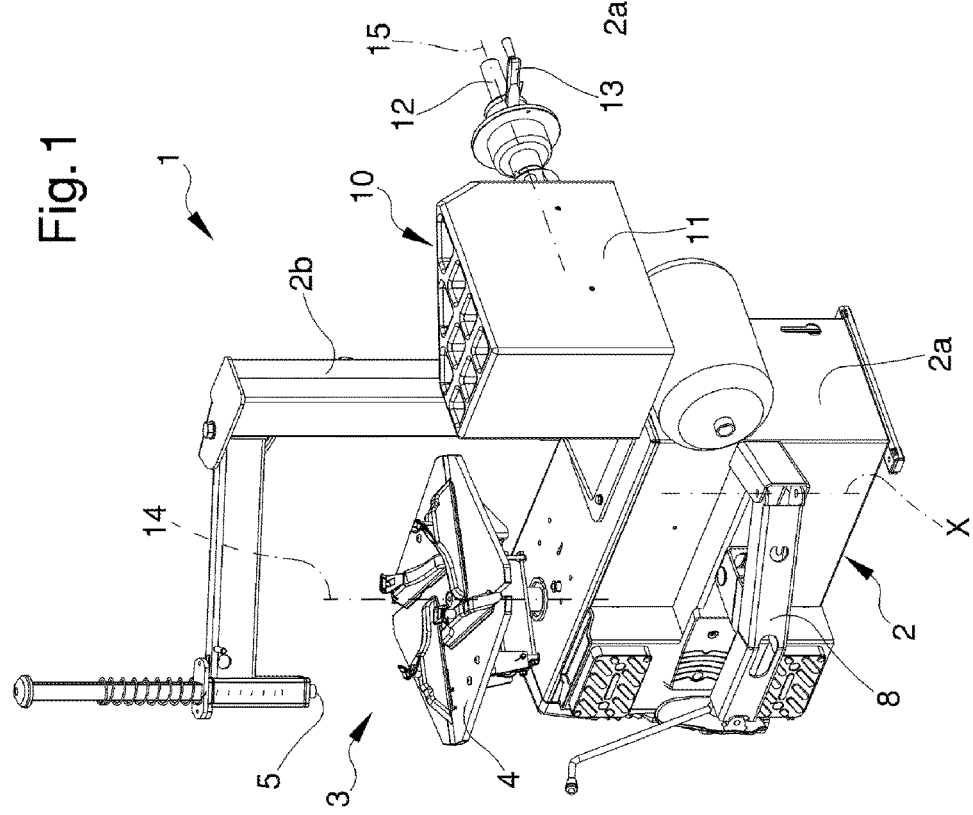
FIG. 2 is a second axonometric view of the machine of FIG. 1.

In the first embodiment shown in FIGS. 1 and 2, the base element 11 of the balancing device 10 is associated with the upright 2b.

More particularly, in this embodiment, the base element 11 is arranged on the opposite side of the support element 4 with respect to the upright 2b. This particular positioning of the balancing device 10 allows to reduce the overall dimensions of the machine 1 and, at the same time, provides adequate room for the operator who has to carry out both the tire fitting/removal and balancing operations.

In the alternative embodiment shown in FIGS. 3 and 4, the base element 11 is associated with the base portion 2a.

Conveniently, the machine 1 comprises manual movement means 13 of the shaft 12, consisting of, e.g., a crank or the like.

Alternatively, the machine 1 may comprise motor means operable to rotate the shaft 12 around the second axis 15.

The balancing device 10 is the type known to the technician of the sector and is therefore able to detect the weight and area of application of the offset masses to be placed on the wheel rim to obtain its correct balancing.

More in detail, the balancing device 10 comprises identification means of at least one balancing plane arranged substantially perpendicular to the axis of the wheel to be balanced, and which identifies a balancing profile on the relative rim, measuring means of the imbalance of the wheel and a processing unit operatively connected to the identification means and to the measuring means to calculate the weight of the offset masses and the angular position of the points of application of the same on the rim. The identification means, the measuring means and the processing unit mentioned above are not visible in detail in the illustrations.

The balancing profile corresponds, therefore, to the intersection between the balancing plane and the rim and identifies the set of points along which the balancing masses are to be positioned which are able to offset the imbalance of the wheel.

The identification means may e.g. be the type of a mechanical feeler 16 movable with respect to the frame 2 both in translation and in rotation. In this case, the balancing profile corresponds therefore to the circumference resulting from the intersection of the balancing plane arranged perpendicular to the axis of the wheel to be balanced and passing through the point of contact between the feeler 16 and the rim with the rim itself.

Alternative embodiments cannot however be ruled out wherein the identification means comprise means for scanning the profile of the rim.

The above-mentioned processing unit is able to detect the position of the balancing plane, and therefore of the relative profile, with respect to a predefined and fixed reference system with respect to the machine. The processing unit identifies for example the balancing profile corresponding to the point of contact of the feeler with the inner surface of the rim.

The measuring means of the imbalance of the wheel comprise force transducers means able to measure the imbalance of the wheel to be balanced when this is rotated around the shaft 12.

The measuring means are also operatively connected to the processing unit, which comprises calculation means of the weight of the offset masses to be applied along the balancing profile and their angular position along the profile itself. The calculation means therefore identify at least one point of application of the offset masses along the balancing profile. The processing unit is therefore able to process the information received from the identification means and from the measuring means, and to calculate the weight and the correct angular position of the offset masses along the balancing profile. The points of application of the offset masses can also be more than one and, in a particular embodiment, their position can be preset by the operator, a special software being provided to split the weight of the offset masses to be applied in each set point.

The processing unit therefore also detects the angular position of the point of application with respect to the fixed reference system, the position of the relative balancing plane being already known.

It follows that the machine according to the invention allows to achieve the proposed objects and in particular the fact is underlined that the machine forming the subject of the present invention allows to carry out both the removal of the tire from the relative wheel and the balancing operation.

The tire-changing machine according to the invention therefore allows to considerably reduce, compared to the machines known to date, the economic investment required to a company or firm to provide tires removal and wheel balancing services.

It is understood that the foregoing description is by way of example only and non-limiting, so any practical and constructive variations are included within the protective scope of the present technical embodiment, as claimed hereinafter.

The invention claimed is:

1. A tire-changing machine for motor vehicles, comprising:
   a bearing frame;
   at least a tire-changing device associated with said frame, having at least a support element of a wheel that can be driven in rotation around a first axis substantially vertical and at least a tool movable with respect to said support element to allow the removal of the tire from the wheel; and
   a wheel balancing device associated with said frame, wherein said wheel balancing device comprises:
      at least a base element associated with said frame; and
      at least a shaft supported in rotation by said base element around a second axis substantially horizontal and able to receive the wheel to be balanced.

2. The machine according to claim 1, wherein said frame comprises at least a base portion that may be positioned on the ground and at least an upright extending vertically from said base portion and supporting said tool, and by the fact that said base element is arranged at the peripheral edge of said frame and is turned to the outside of the same.

3. The machine according to claim 2, wherein said base element is associated with said base portion.

4. The machine according to claim 2, wherein said base element is associated with said upright.

5. The machine according to claim 4, wherein said base element is arranged on the opposite side of said support element with respect to said upright.

6. The machine according to claim 1, wherein said balancing device comprises manual movement means of said shaft.

* * * * *